United States Patent [19]

Pristupa, Jr. et al.

[11] Patent Number: 5,092,788
[45] Date of Patent: Mar. 3, 1992

[54] SELF-CONTAINED UNIVERSAL ACCESSORY CONNECTOR AND SEAL

[75] Inventors: William D. Pristupa, Jr., Delray Beach; Martin E. Holmes, Sunrise, both of Fla.

[73] Assignee: Motorola, Inc., Schaumburg, Ill.

[21] Appl. No.: 620,816

[22] Filed: Dec. 3, 1990

[51] Int. Cl.⁵ .......................................... H01R 13/02
[52] U.S. Cl. .................... 439/225; 439/299; 439/352
[58] Field of Search .............. 439/63, 95, 96, 101, 439/126–128, 225, 278, 282, 283, 366, 596, 603, 607, 916, 299, 352, 296

[56] References Cited

U.S. PATENT DOCUMENTS

| 3,617,985 | 10/1969 | Kehl | 339/92 M |
| 3,644,873 | 2/1972 | Dalton et al. | 439/299 |
| 3,917,372 | 11/1975 | Selinko | 439/352 |
| 4,636,015 | 8/1985 | Ford | 339/14 R |
| 4,636,016 | 8/1985 | Ford | 339/17 F |

Primary Examiner—Paula A. Bradley
Attorney, Agent, or Firm—Juliana Agon

[57] ABSTRACT

A connector assembly is provided whereby a connector (30) is captivated by a radio housing (11) and a battery housing (17).

13 Claims, 2 Drawing Sheets

SELF-CONTAINED UNIVERSAL ACCESSORY CONNECTOR AND SEAL

TECHNICAL FIELD

This invention relates generally to electrical connectors and particularly to electrical connectors having a plurality of electrical accessory and external radio frequency (RF) contacts.

BACKGROUND

These are numerous connector arrangements for providing multiple contact connections, often known as universal connectors for interfacing with accessories. Many of the proir art connector schemes utilize exposed contacts on the top, side, or rear of a portable two-way radio for the connection of microphones and other accessory items. The use of flush contacts provides a clean surface which can be sealed to inhibit the intrusion of foreign materials such as moisture and dust. With exposed contacts, however, a separate external dust cover or seal is then required for the universal connector to protect against dirt and user contact. This external dust cover or seal is then easily lost.

Furthermore, to attach a connector to the outside of the radio, a threaded thumb screw is often used to mechanically mount the connector against the radio. As a result, there are often problems with the threaded screw inserts being easily pulled out of the plastic housing of the radio. While the providing mechanical support, the screw does not facilitate the easy removal of the connector.

Moreover, in RF connectors it is often important that the connector has a proper impedance to match the line to which it is connected. This is often achieved by providing the absolute minimum path of the electrical energy. It is also not desirable to have bulky connectors located on the rear of portable radios which are often worn against the human body.

SUMMARY OF THE INVENTION

Accordingly, it is an advantage of the present invention to not require an external dust cover or seal and a mounting screw in the assembly of an RF and accessory connector. By using the interface between the battery and the radio to captivate the connector, the connector is also sealed in an ergonomically and efficient manner.

Briefly, according to the invention, a connector assembly is provided whereby a connector is captivated by a radio housing and a battery housing.

DETAILED DESCRIPTION OF THE PREFERRED EMBODIMENT

Figure 1:
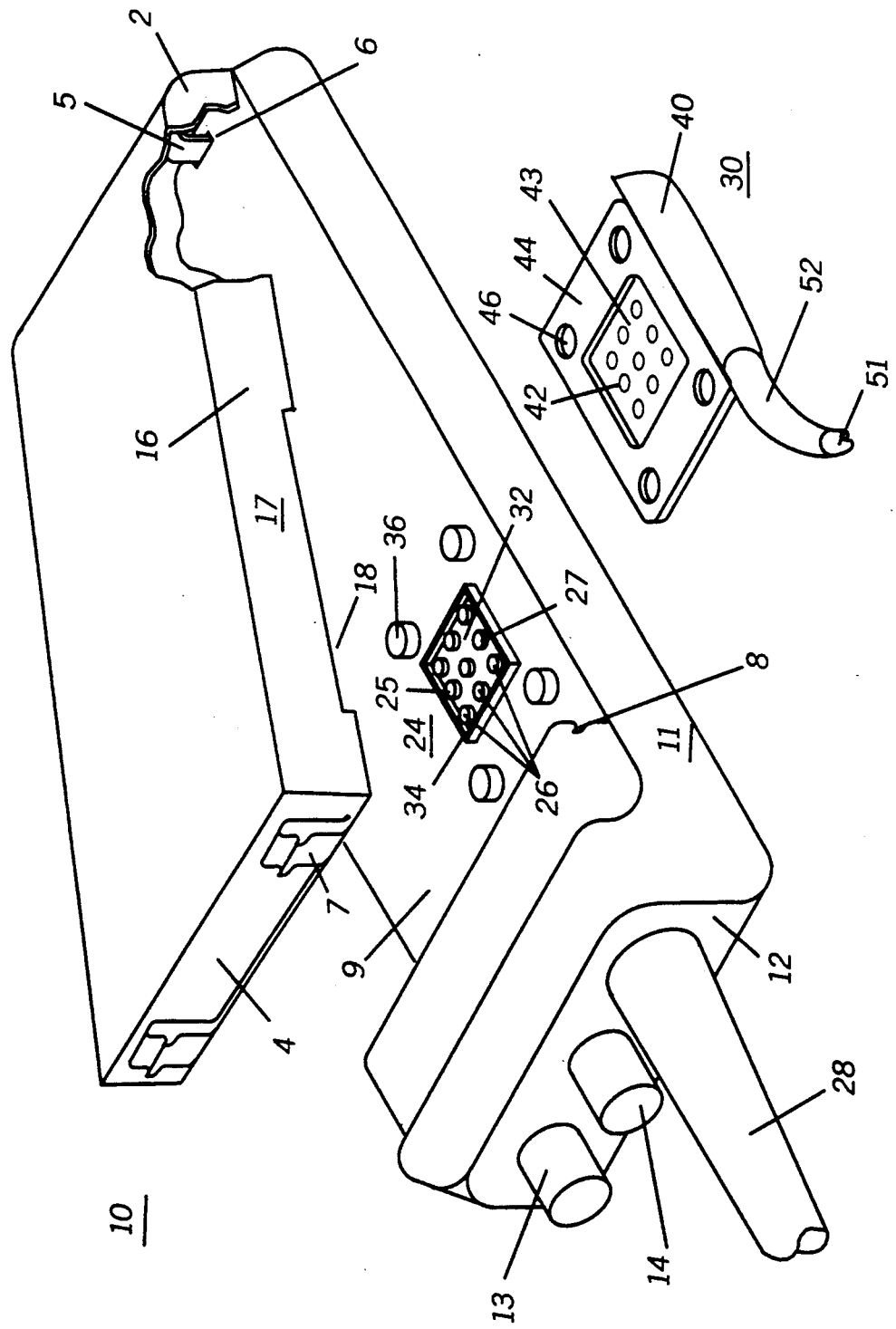
FIG. 1 is a perspective view of a portable radio having accessory and RF contacts for connection to a connector between the radio and the battery housing, in accordance with the invention.

Referring to FIG. 1, it will be understood that a portable radio indicated generally as 10 can utilized the connector 30 of this invention. The radio 10 includes a body 11 in which a top 12 carries volume and channel control knobs 13 and 14. An antenna 28 is also shown mounted at the top 12.

The plurality of electrical contacts 25 which, in this case, constitute 9 contacts laid out in a grid fashion, are located on the back of the radio housing or body 11 which is also called a back cover 9. In the example, the electrical contacts 26 comprise 3 external RF contacts which are located nearest the antenna 28 to provide a minimum path for the electrical energy. The rest of the contacts 25 are the accessory contact 27. The plurality of contacts thus form what is often labeled as a universal connector 24. The back cover 9 also includes a plurality of studs 36 near the peripheral of the universal connector 24 for attaching and aligning the connector 30. It would be appreicated that the universal contacts 25 as shown are above flush and the connector 30 compliant pads are flush but a varying arrangement is possible. For example, the universal connector 24 can have flush contacts to be mated with the assessory connector 30 having the protruding contacts.

The seal 32 having apertures for the universal connector contacts 25 or the accessory connector 30 contacts (not shown) to protrude from and having a raised peripheral rim 34 is placed over the contacts 25 on the back cover 9. The seal 32 seals the interface between the radio back cover 9 and the connector 30 (or the battery housing 17 if no connector is being used). It would be appreciated that the seal 32 needs to have enough resilience or compliance, especially in the rim 34, to provide a seal with or without the accessory connector 30.

For communication with the above flush contacts 25, the connector 30 includes a thin card-like contact carrying portion or interface section 43 which has compliant contact pads 42 (represented as thin circles) placed underneath. With optional flush contacts as previously described, the arrangement would be reversed with the compliant contact being on the radio instead of being on the assessory connector 30. A rim 44 of the connector 30 having apertures 46 surrounds the interface section 43 to receive the contact 25. The connector 30 also includes a body side portion 40 which when attached to the radio 10 is located to the side of the radio 10. The contact carrying portion 43 is attached to the body side portion 40. Entering the body side portion 40 is a cable 51 which is supported by flex-relief rubber member 52. It would be appreciated that electrical connections between the cable 51 and the electrical assemblies connected to the compliant contact pads underneath the contact carrying portion 43 can be made within the body side portion 40. Means for making such connections include soldering, the use mating pins is sockets and the like.

Figure 2:
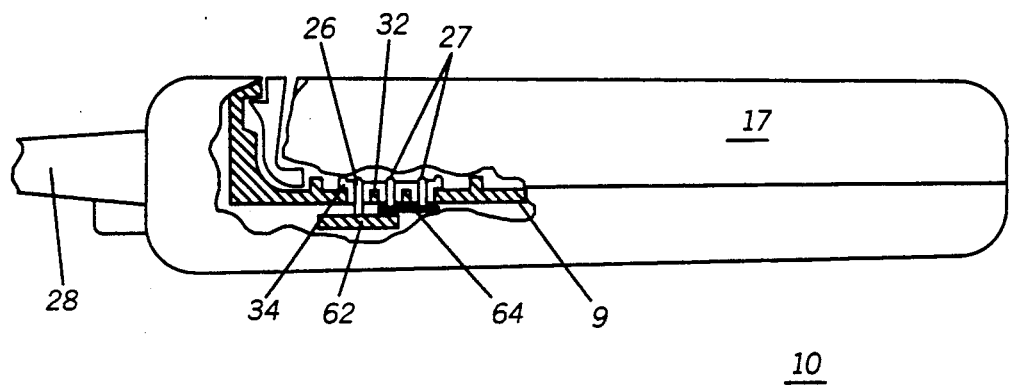
FIG. 2 is a side elevational view of the universal connector of FIG. 1 with the battery housing but without the connector attached.

Referring to FIG. 2, the universal connector 24 is shown in greater detail. The connector 30 is not shown to enable the illustration of the universal connector 24 when the battery housing 17 is attached. The external RF contact 26 is soldered directly to an RF printed circuit (PC) board to minimized the path of the RF energy. The path is also minimized since the external RF contact 26 are located close to the antenna 28. The acessory contacts 27 are soldered to a control flex circuit 64 which is laid on top of the RF PC board 62 and underneath the back cover 9. The seat 32 provides insulation between the external RF contact 26, the accessory contacts 27, amd the back cover 9 of the radio 10.

Referring back to FIG. 1, the body 11 of the radio 10 further includes a battery portion or housing 17 which is detachably connected to a back recess of the radio 10 formed by the body 11 the back cover 9, and the top 12 of the radio. The battery housing 17 includes a first 2 and second 4 opposed end portions and an interconnecting intermediate portion 16. As can be seen in both FIGS. 1 and 2, the first end portion 2 is pivotally anchored to the back recess of the radio housing of back cover 9, for example, by a pin or protrusion 5 of the battery housing 17 entering an indentation 6 of the back cover 9. The second end portion 4 can removably fasten the battery housing 17 to the back recess or cover 9 by a latching means. It would be appreciated that the latching means can be, for example, a member 7 of the battery housing 17 being received by a notch 8 of the top 12 of the radio 10. To make room for the connector 30, a seal 32, and a plurality of contacts 25 underneath, the interconnecting portion has a recess 18 (which is located near the top 12 of the radio 10 when the battery is attached). The recess 18 is engageable with the connector 30 for biasing the connector 30 against the back recess or cover 9.

It will be understood that when attaching the connector 30 to the radio 10, the apertures 46 of the connector 30 are aligned with the studs 36 on the back cover 9 of the radio 10 by having the studs 36 protrude from the apertures 46. At this point the connector 30 is located relative to the appropriate input/output contacts 25 of the radio 10 with the seal 32 in place. The connector 30 is then pushed or clamped against the back of the radio 10 along its back cover 9 with the studs 36 entering the apertures 46, when the battery housing 17 is snapped into place against the back cover 9 (by the pin 5 entering the indentation 6 and the notch 8 receiving the member 7). The one piece seal 32 with its raised edge or rim 34 thus seals the contacts/radio and radio/accessory interfaces.

Figure 3:
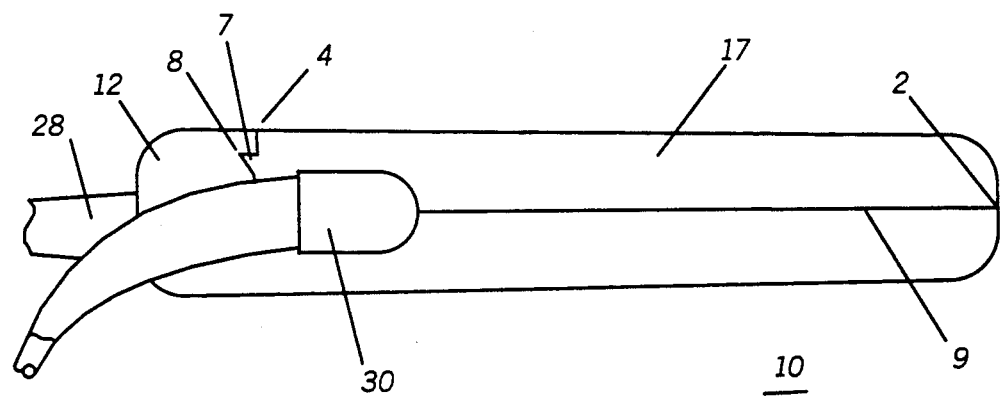
FIG. 3 is a side elevation view of the connector of FIG. 1 attached.

Referring to FIG. 3, the placement of the connector 30 between the battery housing 17 and the back cover 9 thereby provides a mechanism to mechanically mount the connector 30 without further requiring an additional step or a tool to latch or dislodge the accessory connector 30 to the radio 10. Clamping the battery housing 17 (with batteries loaded) against the radio 10 incorporates the strength of the back cover 9 (metal casting) into the universal connector 30. This incorporated strength eliminates the requirement for additional support such as screws and the associated problems with threaded inserts being pulled out of a side of the radio (which is often made out of plastic). The connector 30 is thus rigidly attached to the radio 10 when the battery 17 is snapped into place.

It is thought that the structural features and functional advantages of the accessory and RF connector have become fully apparent from the foregoing description of parts, but for completeness of disclosure a brief description of the operation function of the connector will be given.

It will be understood that the multi-contact connector 30 can be utilized for providing various purposes in use of the portable radio 10. The accessory contacts 27 can be used to carry the audio to drive a remote speaker, provide a microphone connection for a remote microphone, provide push-to-talk connection, as well as provide digital controls and display information, and provide test contacts for use in manufacturing, assembly and testing of the radio.

The RF contacts 26 can be utilized for providing a remote antenna connection as for example of a microphone carried antenna of the type typical in public safety application. It will be further appreciated that where an application does not require the use of the RF contacts 26 and/or the accessory contacts 27, the connector 30 can be deleted from the universal connector 24 without impairing the operation of the radio 10.

In use, when the connector 30 is attached to a device such as the radio 10, the contacts 27 are placed firmly into contact with the compliant contact pads located underneath the contact carrying section 43 of the connector 30. The resilient or compliant contact pads underneath the contact carrying portion 43 is biased towards the contact 25 by the battery housing 17 when the battery is attached.

In summary, no additional complex latching feature is required to attach the connector since the connector is captivated by the battery housing when it is looked into place against the radio. In addition, there is no need for an extra dust cover since the battery housing itself serves as the dust cover when the battery housing is locked into place. The requirment of protected contacts of the prior art is not necessary since the RF contacts can be above flush since they are only accessible when the battery is detached from the radio (i.e. when no power can be applied). This invention therefore provides a connector for radio input/output connections which can be simply removed by the user without any tools by merely disengaging the battery as contrasted with the prior art connector which required screw removal or the use of tools.

What is claimed is:

1. A connector asssembly, comprising:
   a radio housing for housing a radio and having at least one electrical contact located on an external surface of said radio housing;
   said radio housing including means for receiving a battery housing for supplying power to said radio;
   said battery housing removably attached to said external surface of said radio housing for housing a battery for operating said radio; and
   a connector retained between said radio housing and said battery housing, said connector being coupled to said at least one electrical contact when said radio housing is attached to said battery housing.

2. A accessory connector assembly, comprising:
   a radio housing for housing a radio and having battery receiving means for receiving a battery housing on a back side of said radio housing;
   a battery housing for housing a battery for operating said radio removably attached to said battery receiving means; and
   an accessory connector rigidly retained between said battery receiving means of said radio housing and said battery housing.

3. A self-contained universal connector assembly for a radio, comprising:
   a radio housing having a back recess for loading a battery housing;
   a plurality of contacts protruding through one surface of said back recess;
   a self-contained connector positioned to engage said plurality of contacts on said surface of said back recess; and
   a battery housing for clamping said connector against said back recess when said battery housing is clamped within said back recess.

4. The self-contained connector assembly of claim 3 wherein said battery housing includes first and second opposed end portions and an interconnecting intermediate portion,
- said first end portion being pivotally anchored to said back recess of said radio housing,
- said second end portion removably fastening said battery housing to said back recess, and
- said interconnecting portion having a recess engageable with said connector for biasing said connector against said back recess.

5. The self-contained connector assembly of claim 3 wherein said plurality of contacts comprise:
- a plurality of external radio frequency (RF) contacts; and
- a plurality of accessory contacts.

6. The self-contained connector assembly of claim 5 wherein said plurality of external RF contacts are located near an antenna of said radio.

7. The self-contained connector assembly of claim 5 wherein said said plurality of external RF contacts are connected to an RF board located underneath said back recess.

8. The self-contained connector assembly of claim 7 wherein said plurality of accessory contacts are connected to a flex circuit located between said back recess and said RF PC board.

9. The self-contained connector assembly of claim 3 further comprising:
- sealing means located on top of said surface of said back recess and having apertures for receiving said contacts;
- said sealing means including resiliency means for providing a seal with or without said connector.

10. The self-contained connector assembly of claim 9 wherein said battery housing includes a recess for receiving said sealing means.

11. The self-contained connector assembly of claim 3 wherein said back recess includes alignment means for aligning said connector.

12. The self-contained connector assembly of claim 11 wherein said connector includes a substantial planar contact carrying portion having receiving means for alignment with said alignment means of said back recess.

13. The self-contained connector assembly of claim 12 wherein said battery housing includes a recess for receiving said substantial planar contact carrying portion of said connector.

* * * * *